US011594734B2

(12) United States Patent
Aoki et al.

(10) Patent No.: US 11,594,734 B2
(45) Date of Patent: Feb. 28, 2023

(54) VINYLIDENE FLUORIDE POLYMER, BINDER COMPOSITION, ELECTRODE MIXTURE, ELECTRODE, AND NON-AQUEOUS ELECTROLYTE SECONDARY BATTERY, AND METHOD FOR PRODUCING ELECTRODE MIXTURE

(71) Applicant: KUREHA CORPORATION, Tokyo (JP)

(72) Inventors: Kenta Aoki, Tokyo (JP); Shota Kobayashi, Tokyo (JP); Kana Ashida, Tokyo (JP)

(73) Assignee: KUREHA CORPORATION, Tokyo (JP)

( * ) Notice: Subject to any disclaimer, the term of this patent is extended or adjusted under 35 U.S.C. 154(b) by 440 days.

(21) Appl. No.: 16/966,970

(22) PCT Filed: Oct. 29, 2018

(86) PCT No.: PCT/JP2018/040180
§ 371 (c)(1),
(2) Date: Aug. 3, 2020

(87) PCT Pub. No.: WO2019/167338
PCT Pub. Date: Sep. 6, 2019

(65) Prior Publication Data
US 2021/0047448 A1 Feb. 18, 2021

(30) Foreign Application Priority Data
Feb. 28, 2018 (JP) .............................. JP2018-035821

(51) Int. Cl.
| H01M 4/62 | (2006.01) |
| C08F 214/22 | (2006.01) |
| H01M 4/04 | (2006.01) |
| H01M 4/36 | (2006.01) |
| H01M 4/66 | (2006.01) |
| H01M 10/0525 | (2010.01) |

(52) U.S. Cl.
CPC ......... *H01M 4/623* (2013.01); *C08F 214/225* (2013.01); *H01M 4/0404* (2013.01); *H01M 4/366* (2013.01); *H01M 4/662* (2013.01); *H01M 10/0525* (2013.01)

(58) Field of Classification Search
CPC .... H01M 4/623; H01M 4/0404; H01M 4/366; H01M 4/662; H01M 10/0525; H01M 4/13; H01M 4/622; C08F 214/225; C08F 8/32; C08F 259/08; C08F 214/22; C08F 220/365; C08L 51/003; C08L 27/16; Y02E 60/10
See application file for complete search history.

(56) References Cited

U.S. PATENT DOCUMENTS

| 5,667,684 A | 9/1997 | Motomura et al. |
| 7,745,530 B2 | 6/2010 | Mitsuhata et al. |
| 8,337,725 B2 | 12/2012 | Abusleme et al. |
| 2004/0192828 A1 | 9/2004 | Mitsuhata et al. |
| 2010/0133482 A1 | 6/2010 | Abusleme et al. |
| 2013/0273424 A1 | 10/2013 | Watanabe et al. |
| 2016/0369028 A1 | 12/2016 | Tonelli et al. |
| 2020/0235401 A1 | 7/2020 | Sakai et al. |

FOREIGN PATENT DOCUMENTS

| CN | 1714465 A | 12/2005 |
| CN | 102187503 A | 9/2011 |
| CN | 102731707 A | 10/2012 |
| JP | H07-289891 A | 11/1995 |
| JP | 2003-155313 A | 5/2003 |
| JP | 2006-019082 A | 1/2006 |
| JP | 2006-052362 A | 2/2006 |
| JP | 2010-525124 A | 7/2010 |
| JP | 2012-219125 A | 11/2012 |
| JP | 2016-072162 A | 5/2016 |
| JP | 2017-506692 A | 3/2017 |
| WO | 2003/002660 A1 | 1/2003 |
| WO | 2008/129041 A1 | 10/2008 |
| WO | WO 2018/008262 A1 | 1/2018 |

OTHER PUBLICATIONS

Office Action dated Sep. 27, 2021, in Chinese Patent Application No. 201880087766.4.
English translation of International Preliminary Report on Patentability and Written Opinion dated Sep. 10, 2020, in PCT/JP2018/040180 (Forms PCT/IB/338,PCT/IB/373, and PCT/ISA/237).
Office Action dated Jan. 27, 2022, in Republic of Korea Patent Application No. 10-2020-7025868.
Office Action dated Nov. 2, 2021, in Japanese Patent Application No. 2018-035821.
International Search Report of the International Searching Authority for PCT/JP2018/040180 dated Jan. 15, 2019.
English translation of International Search Report of the International Searching Authority for PCT/JP2018/040180 dated Jan. 15, 2019.
Extended European Search Report dated Feb. 23, 2021, in European Patent Application No. 18907517.9.

(Continued)

*Primary Examiner* — Andrew J. Oyer
(74) *Attorney, Agent, or Firm* — Birch, Stewart, Kolasch & Birch, LLP

(57) ABSTRACT

As a novel vinylidene fluoride polymer and its use, provided are a binder composition, an electrode mixture, an electrode, and a non-aqueous electrolyte secondary battery including the vinylidene fluoride containing the vinylidene fluoride polymer. The vinylidene fluoride polymer includes a first structural unit derived from vinylidene fluoride and a second structural unit derived from a monomer other than vinylidene fluoride. The monomer to be the second structural unit is a primary amine, a secondary amine, or a tertiary amine having at least one of a hydroxyl group and a carboxyl group, and the content of the second structural unit is from 0.05 to 20 mol % when the total of structural units derived from all the monomers constituting the vinylidene fluoride polymer is 100 mol %.

7 Claims, No Drawings

(56) References Cited

OTHER PUBLICATIONS

Nallappan et al., "An Optimized Covalent Immobilization of Glucamine on Electrospun Nanofibrous Poly(vinylidene fluoride) Sheets Grafted with Oxirane Groups for Higher Boron Adsorption," Fibers and Polymers (2018), vol. 19, No. 8., pp. 1694-1705.

VINYLIDENE FLUORIDE POLYMER, BINDER COMPOSITION, ELECTRODE MIXTURE, ELECTRODE, AND NON-AQUEOUS ELECTROLYTE SECONDARY BATTERY, AND METHOD FOR PRODUCING ELECTRODE MIXTURE

TECHNICAL FIELD

The present invention relates to a vinylidene fluoride polymer and its use. More specifically, the present invention relates to a vinylidene fluoride polymer, a binder composition, an electrode mixture, an electrode, and a non-aqueous electrolyte secondary battery including the same, and a method for producing an electrode mixture.

BACKGROUND ART

Vinylidene fluoride copolymers mainly containing repeating units derived from vinylidene fluoride are widely used as binder resins for batteries such as lithium ion secondary batteries. The binder resin is used to adhere an electrode active material to a current collector.

For example, Patent Document 1 discloses a vinylidene fluoride copolymer containing hydroxyethyl acrylate (HEA) having a hydroxy group.

Patent Document 2 discloses a binder resin containing a vinylidene fluoride copolymer containing a structural unit derived from vinylidene fluoride, a structural unit derived from a monomer containing a carboxyl group, and a structural unit derived from a monomer containing a functional group having a nitrogen atom.

CITATION LIST

Patent Document

Patent Document 1: JP 2010-525124 T
Patent Document 2: JP 2012-219125 A

SUMMARY OF INVENTION

Technical Problem

In recent years, in order to improve battery performance, a binder resin having higher adhesiveness than the binder resin disclosed in Patent Document 2 is required.

The present invention has been made in view of the above problems, and a main object of the present invention is to provide a novel vinylidene fluoride polymer that contributes to the improvement in the adhesiveness of a binder resin used in a battery, and a binder composition containing the same.

Solution to Problem

As a result of repeated intensive studies by the present inventors to solve the above-mentioned problems, they found that a binder composition that contributes to the improvement in adhesiveness is obtained by a composition that contains a first structural unit derived from vinylidene fluoride and a second structural unit derived from a monomer other than vinylidene fluoride, the monomer to be the second structural unit being an amine having at least one of a hydroxyl group and a carboxyl group, and the amount of the second structural unit contained in the vinylidene fluoride polymer being a specific amount, and completed the present invention.

That is, the vinylidene fluoride polymer according to one aspect of the present invention is a vinylidene fluoride polymer containing a first structural unit derived from vinylidene fluoride and a second structural unit derived from a monomer other than vinylidene fluoride, the monomer to be the second structural unit being a primary amine, a secondary amine, or a tertiary amine having at least one of a hydroxyl group and a carboxyl group, and the content of the second structural unit being from 0.05 to 20 mol % when the total of structural units derived from all the monomers constituting the vinylidene fluoride polymer is 100 mol %.

Advantageous Effects of Invention

One aspect of the present invention provides a novel vinylidene fluoride polymer that contributes to the improvement in the adhesiveness of a binder resin used in a battery, a binder composition, an electrode mixture, an electrode, and a non-aqueous electrolyte secondary battery including the same, and a method for producing an electrode mixture.

DESCRIPTION OF EMBODIMENTS

Hereinafter, embodiments of the present invention will be described in detail.

Vinylidene Fluoride Polymer

The vinylidene fluoride polymer of the present embodiment contains a first structural unit derived from vinylidene fluoride and a second structural unit derived from a monomer other than vinylidene fluoride, the monomer to be the second structural unit is a primary amine, a secondary amine, or a tertiary amine having at least one of a hydroxyl group and a carboxyl group, and the content of the second structural unit being from 0.05 to 20 mol % when the total of structural units derived from all the monomers constituting the vinylidene fluoride polymer is 100 mol %.

The monomer other than vinylidene fluoride is a monomer that is copolymerizable with vinylidene fluoride. Examples of the monomer include a compound represented by Formula (1) below:

[Chemical Formula 1]

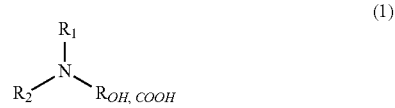

in Formula (1), $R_1$ is a hydrogen atom or has a (meth)acrylate group, $R_2$ has a (meth)acrylate group, and $R_{OH, COOH}$ is a carbon skeleton of a hydrocarbon having from 1 to 7 carbon atoms, in which one or more hydrogen atoms bonded to those carbon atoms are substituted with at least one of a hydroxyl group and a carboxyl group. In the present specification, a (meth)acrylate group refers to an acrylate group or a methacrylate group.

In a preferred embodiment of the compound of Formula (1), $R_{OH, COOH}$ is a carbon skeleton in which preferably from 1 to 7 carbon atoms, more preferably from 2 to 6 carbon atoms, in which preferably 1 or more, more preferably 2 or more of the hydrogen atoms bonded to those carbon atoms are substituted with at least one of a hydroxyl group and a carboxyl group.

Specific examples of the compound represented by Formula (1) include compounds represented by Formula (2) below:

[Chemical Formula 2]

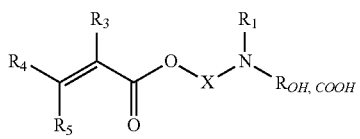

(2)

in Formula (2), $R_3$, $R_4$ and $R_5$ are each independently a hydrogen atom, a chlorine atom, or an alkyl group having from 1 to 5 carbon atoms, X is an atomic group having a main chain constituted of 1 to 18 atoms, and $R_1$ is the same as $R_1$ in the above Formula (1).

From the viewpoint of polymerization reactivity, in Formula (2), $R_3$, $R_4$, and $R_5$ are preferably alkyl groups having from 1 to 5 carbon atoms, more preferably alkyl groups having from 1 to 3 carbon atoms, and even more preferably hydrogen atoms or methyl groups.

In Formula (2), the number of main chain atoms means the number of atoms in the skeleton of the chain connecting the group described on the right side of X (—$NR_1$—$R_{OH, COOH}$) and the group described on the left side of X ($R_4R_5C$=$CR_3$—COO—) with the smallest number of atoms. The number of atoms in the main chain does not include the number of hydrogen atoms.

In Formula (2), the molecular weight of the atomic group is preferably 120 or less, more preferably 90 or less, and even more preferably 70 or less.

Only one type of the compound represented by Formula (2) may be used alone, or two or more types may be used.

The compound represented by Formula (2) is prepared by using, for example, glycidyl methacrylate as a matrix, and reacting the matrix with a compound for modifying the matrix having a nitrogen atom (N) and one or both of a hydroxyl group (OH) and a carboxyl group (COOH) (hereinafter, this compound is referred to as a "modifying compound").

Examples of the modifying compound include D-glucamine, 4-aminobutyric acid, N-methyl-D-glucamine, 4-amino-3-hydroxybutyric acid, aminoethanol, 2-(2-aminoethoxy)ethanol, 2-amino-1-phenylethanol, diethanolamine, and O-phosphorylethanolamine.

The reaction between glycidyl methacrylate and the modifying compound may be carried out, for example, by mixing the glycidyl methacrylate and the modifying compound under heating and stirring in an organic solvent or water.

Further, the embodiment is not limited to the case where the compound itself represented by Formula (2) is used during the polymerization. For example, the scope of the present embodiment includes the vinylidene fluoride polymer prepared by polymerizing the compound to be the matrix, and then modifying the matrix in the polymer; the vinylidene fluoride polymer is considered to be polymerized using a compound represented by Formula (2).

Specific examples of the compound represented by Formula (2) include compounds represented by Formulas (3) to (6).

[Chemical Formula 3]

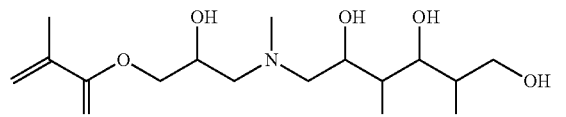

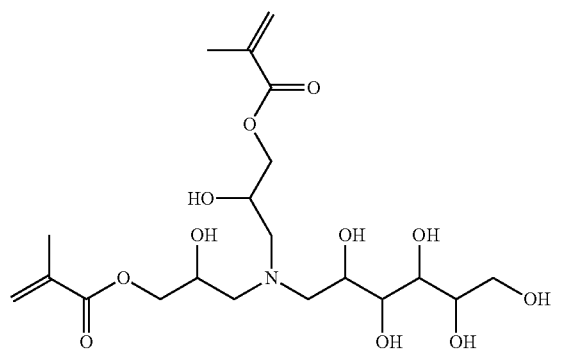

The vinylidene fluoride polymer of the present embodiment preferably contains the second structural unit in an amount from 0.01 to 20 mol %, more preferably from 0.05 to 10 mol %, and even more preferably from 0.1 to 5 mol % when the total amount of the first structural unit and the second structural unit is 100 mol %. Within this range, the adhesiveness due to the vinylidene fluoride polymer of the present embodiment can be suitably used. The abundance of each structural unit can be determined by $^1$H NMR spectrum or neutralization titration.

The vinylidene fluoride polymer of the present embodiment may contain a structural unit derived from a compound other than vinylidene fluoride and the compound represented by Formula (1) (hereinafter referred to as "optional compound") as long as the effect of the present invention is not impaired. The content of the structural unit of the optional monomer is usually from 0.01 to 10 mol %.

The optional compound is not limited as long as it is copolymerizable with vinylidene fluoride and the compound represented by Formula (1). Examples of the compound include fluorine-based monomers copolymerizable with vinylidene fluoride, hydrocarbon-based monomers such as ethylene and propylene, and monomers copolymerizable with Formula (1) above. Examples of the fluorine-based monomers that are copolymerizable with vinylidene fluoride include vinyl fluoride, trifluoroethylene, tetrafluoroethylene, chlorotrifluoroethylene, and hexafluoroalkyl vinyl ether. Examples of monomers that are copolymerizable with the compounds of Formula (1) include (meth)acrylic acid and alkyl (meth)acrylate compounds represented by methyl (meth)acrylate. Furthermore, one type of these other monomers may be used alone, or two or more types may be used.

The vinylidene fluoride polymer of the present embodiment is obtained by polymerizing vinylidene fluoride and the compound represented by Formula (1) by a known method. The polymerization method is not particularly limited, and examples thereof include suspension polymerization, emulsion polymerization, solution polymerization, and graft polymerization. Among these, aqueous suspension polymerization, emulsion polymerization, or graft polymerization is preferable. Vinylidene fluoride used for polymerization is a well-known compound, and common commercial products may be used. In addition, as the compound represented by Formula (1) or (2), those obtained by the above-mentioned methods may be used.

The vinylidene fluoride polymer is obtained by polymerizing preferably from 80 to 99.99 parts by mass of vinylidene fluoride and from 0.01 to 20 parts by mass of the compound represented by Formula (1) or (2), more preferably from 85 to 99.95 parts by mass parts of vinylidene fluoride and from 0.05 to 15 parts by mass of the compound represented by Formula (1) or (2), even more preferably from 90 to 99.9 parts by mass of vinylidene fluoride and 0.1 to 10 parts by mass of the compound represented by Formula (1) or (2) (where the total amount of vinylidene fluoride and the compound represented by Formula (1) or (2) is 100 parts by mass).

The vinylidene fluoride polymer of the present embodiment may be a copolymer or a graft polymer.

The inherent viscosity of the vinylidene fluoride polymer of the present embodiment is preferably from 0.5 to 5.0 dL/g, and more preferably from 1.0 to 4.0 dL/g. Within this range, when applying the electrode mixture containing the vinylidene fluoride polymer, it is possible to easily manufacture the electrode without causing unevenness in the thickness of the electrode. The electrode mixture and the electrodes will be described in detail below.

The inherent viscosity may be obtained by dissolving 80 mg of the vinylidene fluoride polymer of the present embodiment in 20 ml of N,N-dimethylformamide and using an Ubbelohde viscometer in a thermostat at 30° C. by the following equation.

$$\eta_i = (1/C) \cdot \ln(\eta/\eta_0)$$

Here, $\eta$ is the viscosity of the vinylidene fluoride polymer solution, $\eta_0$ is the viscosity of N,N-dimethylformamide (solvent) alone, and C is 0.4 g/dL.

Binder Composition

The binder composition of the present embodiment is a binder composition used for binding an electrode active material to a current collector, and contains the vinylidene fluoride polymer of the present embodiment.

The binder composition may contain a non-aqueous solvent. As the non-aqueous solvent, a solvent capable of dissolving a vinylidene fluoride polymer is used. Examples thereof include N-methyl-2-pyrrolidone, dimethylformamide, N,N-dimethylacetamide, N,N-dimethylsulfoxide, hexamethylphosphoamide, dioxane, tetrahydrofuran, tetramethylurea, triethyl phosphate, trimethyl phosphate, acetone, methyliu ethyl ketone, and tetrahydrofuran. These non-aqueous solvents may be used alone, or a mixture of two or more types of these may be used.

In the binder composition according to the present embodiment, the non-aqueous solvent is preferably from 400 to 10000 parts by mass, and more preferably from 600 to 5000 parts by mass when the vinylidene fluoride polymer is 100 parts by mass. Within this range, the solution viscosity of the binder composition will be appropriate, and handling will be easy.

Electrode Mixture

The electrode mixture of the present embodiment contains the above-mentioned binder composition and an electrode active material. This electrode mixture can be obtained by adding an electrode active material to the binder composition. When the electrode active material is added to the binder composition, the electrode active material may be directly added as it is to the binder composition, or a binder composition obtained by adding the electrode active material to the above-mentioned non-aqueous solvent followed by stirring and mixing may be used as an electrode mixture. The method for preparing the electrode mixture is not limited to this, and another preparation method will be described later.

The electrode active material used in the electrode mixture is not particularly limited, and known negative electrode active materials (hereinafter may be referred to as negative electrode active materials), positive electrode active materials (hereinafter may be referred to as positive electrode active materials) may be used.

Examples of the negative electrode active material include a carbon material, a metal/alloy material, and a metal oxide. Among them, the carbon material is preferable.

Examples of the carbon material include artificial graphite, natural graphite, non-graphitizable carbon, and easily graphitizable carbon. One type carbon materials may be used alone, or two or more types may be used.

When such a carbon material is used, the energy density of the battery can be increased.

Examples of the positive electrode active material include a lithium-based positive electrode active material containing lithium. Examples of the lithium-based positive electrode active material include composite metal chalcogenide compounds or composite metal oxides represented by the general formula $LiMY_2$ such as $LiCoO_2$ and $LiCo_xNi_{1-x}O_2$ ($0 \leq x < 1$), composite metal oxides having a spinel structure such as $LiMn_2O_4$, and olivine-type lithium compounds such as $LiFePO_4$. Here, M is at least one kind of transition metal such as Co, Ni, Fe, Mn, Cr and V, and Y is a chalcogen element such as O and S.

In the electrode mixture of the present embodiment, the vinylidene fluoride polymer is preferably from 0.5 to 15 parts by mass, more preferably from 0.7 to 10 parts by mass, the active material is preferably from 85 to 99.5 parts by mass, and more preferably from 90 to 99.3 parts by mass per 100 parts by mass in total of vinylidene fluoride polymer and electrode active material. Within this range, when the electrode for a non-aqueous electrolyte secondary battery described below is produced using the electrode mixture, the peel strength between the mixture layer described below and the current collector is excellent.

The electrode mixture of the present embodiment may contain other components in addition to the vinylidene fluoride polymer, the non-aqueous solvent, and the electrode active material. Examples of the other component include a conductive auxiliary and a pigment dispersant. Examples of the conductive auxiliary include carbonaceous substances such as carbon black, carbon nanotubes, graphite fine powder, and graphite fiber, and metal fine powder or metal fiber such as nickel and aluminum. Examples of the pigment dispersant include polyvinylpyrrolidone. When the electrode mixture contains other components, the other component is usually used in an amount of 2 to 400 parts by mass per 100 parts by mass of the vinylidene fluoride polymer.

The method for producing the electrode mixture is not particularly limited, and the components may be mixed by a known method. At that time, the order of mixing the components is not particularly limited.

Next, another method for preparing the electrode mixture will be described.

This adjustment method includes: preparing a raw material electrode mixture containing a polar group-containing vinylidene fluoride polymer or a reactive group-containing vinylidene fluoride polymer to be a source of the above-mentioned vinylidene fluoride polymer, an electrode active material, and a non-aqueous solvent; and adding a compound represented by Formula (7) described below to the raw material electrode mixture and reacting the polar group-containing vinylidene fluoride polymer or the reactive group-containing vinylidene fluoride polymer with the compound to produce the above-mentioned vinylidene fluoride polymer according to the present embodiment. Hereinafter, when it is not necessary to distinguish between a polar group-containing vinylidene fluoride polymer and a reactive group-containing vinylidene fluoride polymer, these are collectively referred to as a "raw material vinylidene fluoride polymer". By modifying the raw material vinylidene fluoride polymer in the raw material electrode mixture, an electrode mixture containing the above-mentioned vinylidene fluoride polymer, the electrode active material, and the non-aqueous solvent can be obtained. The present preparation method is preferably used when the vinylidene fluoride polymer contained in the electrode mixture is a vinylidene fluoride polymer in which the monomer to be the second structural unit is the compound represented by Formula (1).

The raw material vinylidene fluoride polymer refers to the vinylidene fluoride polymer to be a raw material, which is converted to the above-mentioned vinylidene fluoride polymer by reacting with a compound represented by Formula (7) below (hereinafter may be referred to as compound (7)):

[Chemical Formula 4]

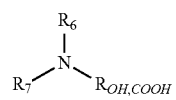

(7)

in Formula (7), $R_6$ and $R_7$ are each independently a hydrogen atom or a group having a carbon skeleton having from 1 to 7 carbon atoms; $R_{OH,\ COOH}$ is a carbon skeleton of hydrocarbon having from 1 to 7 carbon atoms, in which one or more of the hydrogen atoms bonded to those carbon atoms are substituted with at least one of a hydroxyl group and a carboxyl group, and is the same as $R_{OH,\ COOH}$ in Formula (1) above.

Examples of compound (7) include each compound such as D-glucamine exemplified in the description of the method for producing the compound represented by Formula (2).

The compound represented by Formula (1) may be obtained, for example, by using acryloyloxypropylsuccinic acid or glycidyl acrylate as a matrix and reacting the matrix with compound (7). Accordingly, the raw material vinylidene fluoride polymer is a vinylidene fluoride polymer obtained by polymerizing vinylidene fluoride and a matrix compound that reacts with compound (7) to produce the monomer represented by Formula (1).

The polar group and the reactive group are intended to be a functional group capable of reacting with a compound, and examples thereof include an epoxy group, a carboxyl group, and a hydroxyl group.

Examples of the matrix compound that reacts with compound (7) to produce the monomer represented by Formula (1) include glycidyl methacrylate, glycidyl acrylate, acrylic acid, carboxyethyl acrylic acid, carboxypropyl acrylic acid, acryloyloxyethyl succinic acid, acryloyloxypropyl succinic acid, hydroxyethyl acrylic acid, and hydroxypropyl acrylic acid.

The reaction between the raw material vinylidene fluoride polymer and compound (7) is carried out by adding the compound at the time of producing the electrode mixture, and stirring at a temperature from 15 to 85° C., preferably from 20 to 80° C., and more preferably from 25 to 70° C.

The weight ratio of the raw material vinylidene fluoride polymer and the compound (7) is from 99.9:0.1 to 30:70, preferably from 99.7:0.3 to 40:60, and more preferably from 99.5:0.5 to 50:50.

As described above, the electrode mixture containing the vinylidene fluoride polymer, the electrode active material, and the non-aqueous solvent according to the present embodiment can be prepared.

Electrode

The electrode of the present embodiment includes a mixture layer formed of the above-mentioned electrode mixture on the current collector. In the present specification, the mixture layer means a layer formed of the electrode mixture.

The current collector is a base material of the electrode and is a terminal for taking out electricity. Examples of the material for the current collector include iron, stainless steel, steel, aluminum, nickel, and titanium. In order to obtain a non-aqueous electrolyte secondary battery described later using the electrode of this embodiment, it is preferable to use an aluminum foil as the current collector. The shape of the current collector is preferably a foil or a mesh. The thickness of the current collector is usually from 5 to 100 μm, and preferably from 5 to 20 μm.

The mixture layer can be obtained by coating the current collector with the electrode mixture and then drying. Examples of the method for applying the electrode mixture include bar coating, die coating, and comma coating. The electrode mixture is applied to at least one side, preferably both sides, of the current collector.

The electrode mixture is usually dried at a temperature of 50 to 150° C. for 1 to 300 minutes. The pressure for drying is not particularly limited, but drying is usually performed under atmospheric pressure or reduced pressure.

The thickness of the mixture layer is usually from 20 to 250 μm, and preferably from 20 to 150 μm. The basis weight of the mixture layer is usually from 20 to 700 g/m², and preferably from 30 to 500 g/m².

After drying the electrode mixture, heat treatment may be further performed. The heat treatment is usually performed at a temperature of 100 to 250° C. for 1 to 300 minutes. The heat treatment overlaps with the above-mentioned drying treatment, but these treatments may be performed as separate steps or continuously performed steps.

Further, after drying the electrode mixture, the mixture layer may be pressed. The press treatment may be normally performed at from 1 to 200 MP·G. The press treatment is preferable because it improves the electrode density.

Non-Aqueous Electrolyte Secondary Battery

The non-aqueous electrolyte secondary battery of the present embodiment is obtained by applying the above-mentioned electrode mixture to a current collector, and drying it. The phase constitution of the electrode has a two-layer constitution of mixture layer/current collector when the electrode mixture is applied on one surface of the current collector, and has a three-layer structure of a mixture layer/current collector/mixture layer when the electrode mixture is applied on both sides of the current collector.

Non-Aqueous Electrolyte Secondary Battery

The non-aqueous electrolyte secondary battery of the present embodiment includes the above-mentioned electrode. Since this non-aqueous electrolyte secondary battery includes the electrode mixture of the present embodiment, cracks or peeling of the electrodes are unlikely to occur in the steps of pressing, slitting, winding, and the like. Therefore, the non-aqueous electrolyte secondary battery of the present embodiment can improve productivity.

SUMMARY

The vinylidene fluoride polymer according to one aspect of the present invention contains a first structural unit derived from vinylidene fluoride and a second structural unit derived from a monomer other than vinylidene fluoride, the monomer to be the second structural unit being a primary amine, a secondary amine, or a tertiary amine having at least one of a hydroxyl group and a carboxyl group, and the content of the second structural unit being from 0.05 to 20 mol % when the total of structural units derived from all the monomers constituting the vinylidene fluoride polymer is 100 mol %.

In one aspect of the present invention, the above-mentioned monomer is preferably a compound represented by Formula (1) below:

[Chemical Formula 5]

(1)

where $R_1$ is a hydrogen atom or has a (meth)acrylate group, $R_2$ has a (meth)acrylate group, and $R_{OH,\ COOH}$ is a carbon skeleton of a hydrocarbon having from 1 to 7 carbon atoms, in which one or more of the hydrogen atoms bonded to those carbon atoms are substituted with at least one of a hydroxyl group and a carboxyl group.

In an embodiment of the present invention, the vinylidene fluoride polymer preferably has an inherent viscosity from 0.5 to 5.0 dL/g.

One aspect of the present invention provides a binder composition containing a vinylidene fluoride polymer. A binder composition according to one aspect of the present invention is a binder composition used for binding an electrode active material to a current collector, and contains the vinylidene fluoride polymer according to the present invention.

Another aspect of the present invention provides an electrode mixture. An electrode mixture according to one aspect of the present invention contains the above-mentioned binder composition and electrode active material.

Another aspect of the present invention provides an electrode. An electrode according to one aspect of the present invention includes a mixture layer formed of the above-mentioned electrode mixture on a current collector.

Another aspect of the present invention provides a non-aqueous electrolyte secondary battery. A non-aqueous electrolyte secondary battery according to one aspect of the present invention includes the electrode according to one aspect the present invention.

Another aspect of the present invention provides a method for producing an electrode mixture. A method for producing an electrode mixture according to one aspect of the present invention includes:

preparing a raw material electrode mixture containing a polar group-containing vinylidene fluoride polymer or a reactive group-containing vinylidene fluoride polymer, an electrode active material, and a non-aqueous solvent; and adding the compound represented by Formula (7) described below to the raw material electrode mixture and reacting the polar group-containing vinylidene fluoride polymer or the reactive group-containing vinylidene fluoride polymer with the compound to produce the vinylidene fluoride polymer:

[Chemical Formula 6]

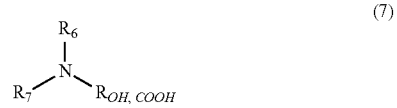

(7)

where $R_6$ and $R_7$ each independently represent a hydrogen atom or have a carbon skeleton having from 1 to 7 carbon atoms, $R_{OH,\ COOH}$ is a carbon skeleton of a hydrocarbon having from 1 to 7 carbon atoms, in which one or more of the hydrogen atoms bonded to those carbon atoms are substituted with at least one of a hydroxyl group and a carboxyl group.

Embodiments of the present invention will be described in further detail hereinafter using examples. The present invention is not limited to the examples below, and it goes without saying that various aspects are possible with regard to the details thereof. Furthermore, the present invention is not limited to the embodiments described above, and various modifications are possible within the scope indicated in the claims. Embodiments obtained by appropriately combining the technical means disclosed by the embodiments are also included in the technical scope of the present invention. In addition, all of the documents described in the present specification are herein incorporated by reference.

EXAMPLES

An example of the present invention will be described below.

Example 1

Production of Polyvinylidene Fluoride (1)

An autoglave with an internal capacity of 2 liters was charged with 1075 g of ion-exchanged water, 0.4 g of methyl cellulose, 2.3 g of dinormal propyl peroxydicarbonate, 5 g of ethyl acetate, and 420 g of vinylidene fluoride (VDF), and the mixture was subjected to suspension polymerization at 25° C. for 15 hours. The maximum pressure during this period reached 4.0 MPa. After completion of polymerization, the polymer slurry was dehydrated and washed with water. Then, the object was dried at 80° C. for 20 hours, thus obtaining powdery polyvinylidene fluoride (1) (hereinafter referred to as PVDF (1)). The inherent viscosity of PVDF (1) was 2.1 dL/g.

Graft Polymerization on PVDF (1)

60 g of PVDF (1) was placed in a polyethylene bag (Lamizip (trade name), available from Seisannipponsha Ltd.), and the inside of the bag was replaced with nitrogen. After that, the bag inlet was heat-sealed.

Next, the bag in which the PVDF (1) was sealed was irradiated with an electron beam so that the absorbed dose of the PVDF (1) was 30 kGy, thus preparing an electron beam-irradiated PVDF (1).

Then, a 300 ml sample bottle was charged with 0.52 g of glycidyl methacrylate (GMA) (available from Tokyo Chemical Industry Co., Ltd.) and 51.4 g of toluene, and 30 g of electron beam-irradiated PVDF (1) was charged therein, and the mixture was mixed at 25° C. under stirring for 3 hours.

The stirred and mixed reaction product was taken out and transferred to a nutsche attached to a suction filtration bottle. The reaction product was washed and filtered in the nutsche using ion-exchanged water to remove unreacted glycidyl methacrylate. Then, the reaction product was washed and filtered in the nutsche using ethanol to remove toluene and a homopolymer of glycidyl methacrylate. Then, the object was dried at 75° C. for 5 hours, thus obtaining a VDF/GMA polymer.

The obtained VDF/GMA polymer was measured for the introduced amount of GMA by 1H NMR measurement. These results are shown in Table 1. The method for measuring 1H NMR is as follows.

1H NMR Measurement

The 1H NMR spectrum of the VDF/GMA polymer was determined under the following conditions.

Apparatus: AVANCE AC 400FT NMR spectrometer available from Bruker Corp.

Measurement Conditions

Frequency: 400 MHz

Measurement solvent: DMSO-$d^6$

Measurement temperature: 25° C.

The amount of the structural unit derived from vinylidene fluoride and the amount of the structural unit derived from glycidyl methacrylate in the polymer were calculated based on the integrated intensities of the signal observed by 1H NMR spectrum at 3.75 ppm originating mainly from glycidyl methacrylate and the signals observed at 2.24 ppm and 2.87 ppm originating mainly from vinylidene fluoride.

The amount (mol %) of the structural unit derived from vinylidene fluoride (VDF amount) possessed by the obtained VDF/GMA polymer was 99.73 mol %, and the amount (mol %) of the structural unit derived from glycidyl methacrylate (GMA amount) was 0.27 mol %.

Next, a 50 ml sample bottle was charged with 2 g of VDF/GMA polymer, 18 g of N-methyl-2-pyrrolidone (NMP), and 0.32 g of N-methyl-D-glucamine (NMG) (available from Tokyo Chemical Industry Co., Ltd.), and the mixture was stirred and mixed at 60° C. for 2 hours. After completion of heating and stirring, the polymer was recovered by a reprecipitation operation using water as a poor solvent.

The recovered polymer was transferred to a nutsche attached to a suction filtration bottle. The polymer was washed and filtered in the nutsche using ion-exchanged water to remove unreacted NMG. Then, the polymer was washed and filtered in the nutsche using ethanol. Thereafter, the object was dried at 75° C. for 5 hours to obtain a VDF/NMG polymer.

The obtained VDF/NMG polymer was measured for the inherent viscosity. The results are shown in Table 1. The method for measuring the inherent viscosity is as follows.

Measurement of Inherent Viscosity

In order to calculate the inherent viscosity $qi$, a polymer solution was prepared by dissolving 80 mg of a polymer in 20 ml of N,N-dimethylformamide. The viscosity $\eta$ of this polymer solution was measured using an Ubbelohde viscometer in a thermostat at 30° C. The inherent viscosity $qi$ can be determined by the following equation using the viscosity $\eta$.

$$\eta i = (1/C)\ln(\eta/\eta 0)$$

Here, $\eta 0$ is the viscosity of the solvent N,N-dimethylformamide, and C is 0.4 g/dL.

Production of Electrode (1)

100 parts by weight of lithium-nickel-cobalt-manganese composite oxide (NCM523; $Li_{1.00}Ni_{0.50}Co_{0.20}Mn_{0.30}O_2$, average particle size 11 μm) as an active material was mixed with 1 part by weight of carbon black (SP; available from Timcal Japan K.K., Super P (trade name), average particle size 40 nm, specific surface area 60 m$^2$/g) as a conductive auxiliary for 30 seconds. 100 parts by weight of the active material was mixed with a 10% by weight binder solution (solvent: NMP) containing 2 parts by weight of VDF/NMG polymer for 3 minutes, and then NMP was added and mixed for 5 minutes to obtain an electrode mixture having a total solid content concentration of the active material, VDF/NMG polymer, and SP of 76%.

The obtained electrode mixture was applied onto a 15 μm thick aluminum foil as a current collector with a bar coater, and this was subjected to primary drying at 110° C. for 30 minutes in a nitrogen atmosphere in a thermostat. Then, secondary drying was performed in a nitrogen atmosphere at 130° C. for 2 hours to produce an electrode.

The obtained electrode was measured for the peel strength. The results are shown in Table 1. The method for measuring the peel strength is as follows.

Measurement of Peel Strength

The adhesion strength between the aluminum foil and the electrode mixture layer was evaluated as the 90° peel strength of the laminate prepared by bonding the upper surface of the electrode formed by coating with a plastic slab, and measured using a tensile tester ("STA-1150 UNIVERSAL TESTING MACHINE" available from ORIENTEC Co., Ltd.) at a head speed of 10 mm/minute according to JIS K 6854-1.

The plastic slab is made of acrylic resin and has a thickness of 5 mm.

Example 2

A VDF/ADG polymer was obtained in the same manner as in Example 1 except that 0.15 g of D-glucamine (ADG) (available from Tokyo Chemical Industry Co., Ltd.) was used in place of N-methyl-D-glucamine of Example 1. The obtained polymer was measured for the inherent viscosity. In addition, an electrode was produced in the same manner as in Example 1, and the peel strength was measured. The results are shown in Table 1.

Example 3

A polymer was obtained in the same manner as in Example 1 except that 0.10 g of 4-amino-3-hydroxybutyric acid (HGABA) (available from Tokyo Chemical Industry Co., Ltd.) was used in place of N-methyl-D-glucamine in Example 1. The obtained polymer was measured for the inherent viscosity. In addition, an electrode was produced in the same manner as in Example 1, and the peel strength was measured. The results are shown in Table 1.

Example 4

Vinylidene Fluoride Copolymer (1): VDF/GA

An autoclave with an internal capacity of 2 liters was charged with 900 g of ion-exchanged water, 0.2 g of hydroxypropylmethylcellulose, 1.92 g of butylperoxypivalate, and 400 g of vinylidene fluoride, and heated to 45° C. A 0.05% by weight GA aqueous solution containing glycidyl acrylate (GA) (available from Tokyo Chemical Industry Co., Ltd.) was continuously supplied to a reactor under the condition that the pressure was kept constant during the polymerization. The obtained slurry was dehydrated and dried to obtain a VDF/GA copolymer as a vinylidene fluoride copolymer (1). GA was added in a total amount of 4.0 g.

The obtained VDF/GA copolymer was measured for the introduced amount of GA by 1H NMR measurement. The results are shown in Table 2. The method for measuring 1H NMR is as follows.

1H NMR Measurement

The 1H NMR spectrum of the VDF/GA copolymer was determined under the following conditions.

Apparatus: AVANCE AC 400FT NMR spectrometer available from Bruker Corp.

Measurement Conditions
Frequency: 400 MHz
Measurement solvent: DMSO-$d^6$
Measurement temperature: 25° C.

The amount of the structural unit derived from vinylidene fluoride and the amount of the structural unit derived from glycidyl acrylate in the polymer were calculated based on the integrated intensities of the signal observed by 1H NMR spectrum at 3.75 ppm originating mainly from glycidyl acrylate and the signals observed at 2.24 ppm and 2.87 ppm originating mainly from vinylidene fluoride.

The amount (mol %) of the structural unit derived from vinylidene fluoride (VDF amount) possessed by the obtained VDF/GA polymer was 99.60 mol %, and the amount (mol %) of the structural unit derived from glycidyl acrylate (GA amount) was 0.40 mol %.

The obtained VDF/GA copolymer was measured for the inherent viscosity; the inherent viscosity was 2.86 dL/g.

Next, a 50 ml sample bottle was charged with 1.8 g of VDF/GA copolymer, 38.2 g of N-methyl-2-pyrrolidone (NMP), and 0.44 g of N-methyl-D-glucamine (NMG) (available from Tokyo Chemical Industry Co., Ltd.), and the mixture was stirred and mixed at 60° C. for 2 hours. After completion of heating and stirring, the polymer was recovered by a reprecipitation operation using water as a poor solvent.

The recovered polymer was transferred to a nutsche attached to a suction filtration bottle. The polymer was washed and filtered in the nutsche using ion-exchanged water to remove unreacted NMG. Then, the polymer was washed and filtered in the nutsche using ethanol. Thereafter, the object was dried at 75° C. for 5 hours to obtain a VDF/NMG copolymer.

An electrode was produced in the same manner as in Example 1 using the obtained VDF/NMG copolymer, and the peel strength was measured. The results are shown in Table 1.

Example 5

A VDF/ADG copolymer was obtained in the same manner as in Example 4 except that 0.20 g of ADG was used in place of NMG in Example 4. An electrode was produced in the same manner as in Example 1 using the obtained VDF/ADG copolymer, and the peel strength was measured. The results are shown in Table 2.

Example 6

A VDF/NMG polymer was obtained in the same manner as in Example 1 except that NMG in Example 1 was 0.016 g. An electrode was produced in the same manner as in Example 1 using the obtained VDF/NMG polymer, and the peel strength was measured. The results are shown in Table 2.

Example 7

An electrode was produced in the same manner as in Example 1 using the VDF/GMA polymer obtained in Example 1, in which NMG was added to the electrode mixture so that the mixing ratio by weight was VDF/GMA polymer:NMG=99.17:0.83. The obtained electrode was measured for the peel strength. The results are shown in Table 2.

Example 8

Vinylidene Fluoride Copolymer (2): VDF/APS

An autoclave with an internal capacity of 2 liters was charged with 1096 g of ion-exchanged water, 0.2 g of Metolose 90SH-100 (available from Shin-Etsu Chemical Co., Ltd.), 2.2 g of a 50 wt. % diisopropyl peroxy dicarbonate-freon 225cb solution, 426 g of vinylidene fluoride, and an initial addition amount of 0.2 g of acryloyloxy propyl succinate, and the temperature was increased to 26° C. over 1 hour. Subsequently, a 6 wt. % acryloyloxy propyl succinate aqueous solution was gradually added at a rate of 0.5 g/minute while the temperature was maintained at 26° C. The obtained polymer slurry was dehydrated and dried to obtain a vinylidene fluoride copolymer (VDF/APS) containing a polar group. A total of 4.0 g of acryloyloxy propyl succinate was added, including the amount added initially.

The obtained VDF/APS copolymer was measured for the introduced amount of APS by 1H NMR measurement. These results are shown in Table 2. The method for measuring 1H NMR is as follows.

1H NMR Measurement

The 1H NMR spectrum of the VDF/GA copolymer was determined under the following conditions.

Apparatus: AVANCE AC 400FT NMR spectrometer available from Bruker Corp.

Measurement Conditions

Frequency: 400 MHz

Measurement solvent: DMSO-$d^6$

Measurement temperature: 25° C.

The amount of the structural unit derived from vinylidene fluoride and the amount of the structural unit derived from acryloyloxypropyl succinic acid in the polymer were calculated based on the integrated intensities of the signal observed by 1H NMR spectrum at 4.18 ppm originating mainly from APS and the signals observed at 2.24 ppm and 2.87 ppm originating mainly from vinylidene fluoride. The amount (mol %) of the structural unit derived from vinylidene fluoride (VDF amount) contained in the obtained VDF/APS polymer was 99.64 mol %, and the amount (mol %) of the structural unit derived from acryloyloxypropylsuccinic acid (APS amount) was 0.36 mol %.

In addition, the obtained VDF/APS copolymer was measured for the inherent viscosity; the inherent viscosity was 2.50 dL/g.

An electrode was produced in the same manner as in Example 1 using the obtained VDF/APS polymer, in which NMG was added to the electrode mixture so that the mixing ratio by weight was VDF/APS:NMG=99.17:0.83. The obtained electrode was measured for the peel strength. The results are shown in Table 2.

Comparative Example 1

Production of Polyvinylidene Fluoride (2)

An autoclave with a content of 2 liters was charged with 1075 g of ion-exchanged water, 0.4 g of methyl cellulose, 2.5 g of diisopropyl peroxydicarbonate, 5 g of ethyl acetate, and 420 g of vinylidene fluoride, followed by suspension polymerization at 25° C. to obtain polyvinylidene fluoride (2) (hereinafter referred to as PVDF (2)).

The obtained PVDF (2) was measured for the inherent viscosity; the inherent viscosity was 1.70 dL/g.

An electrode was produced in the same manner as in Example 1 using the obtained PVDF (2), and the peel strength was measured. The results are shown in Table 1.

Comparative Example 2

Graft polymerization was carried out using PVDF (1) obtained in the same manner as in Example 1.

Graft Polymerization on PVDF (1)

60 g of PVDF (1) was placed in a polyethylene bag (Lamizip (trade name), available from Seisannipponsha Ltd.), and the inside of the bag was replaced with nitrogen. The bag inlet was then heat-sealed.

Next, the bag in which the PVDF (1) was sealed was irradiated with an electron beam so that the absorbed dose of the PVDF (1) was 30 kGy, thus producing an electron beam-irradiated PVDF (1).

Then, a 300 ml sample bottle was charged with 2.6 g of 2-hydroxyethyl acrylate (HEA) (available from Tokyo Chemical Industry Co., Ltd.), 36.3 g of ion-exchanged water, and 13 g of isopropyl alcohol, and 30 g of the electron beam-irradiated PVDF (1) was added thereto. The mixture was stirred and mixed at 25° C. for 3 hours.

The stirred and mixed reaction product was taken out and transferred to a nutsche attached to a suction filtration bottle. The reaction product was washed and filtered in the nutsche using ion-exchanged water to remove unreacted 2-hydroxyethyl acrylate and homopolymers of 2-hydroxyethyl acrylate. Then, the reaction product was washed and filtered in the nutsche using ethanol. Thereafter, the resultant was dried at 75° C. for 5 hours to obtain a VDF/HEA polymer.

The obtained VDF/HEA polymer was measured for the introduced amount of HEA by 1H NMR measurement. The results are shown in Table 1.

The apparatus and measurement conditions in the 1H NMR measurement method are as described in Example 1. The amount of the structural unit derived from vinylidene fluoride and the amount of the structural unit derived from HEA in the polymer were calculated based on the integrated intensities of the signal observed by 1H NMR spectrum at 3.55 ppm originating mainly from HEA and the signals observed at 2.24 ppm and 2.87 ppm originating mainly from vinylidene fluoride.

The amount (mol %) of the structural unit derived from vinylidene fluoride (VDF amount) possessed by the obtained VDF/HEA polymer was 98.8 mol %, and the amount (mol %) of the structural unit derived from HEA (HEA amount) was 1.2 mol %.

The obtained VDF/HEA polymer was measured for the inherent viscosity in the same manner as in Example 1; the inherent viscosity was 1.5 dL/g.

An electrode was produced from the obtained VDF/HEA polymer in the same manner as in Example 1, and the peel strength was measured. The results are shown in Table 1.

Comparative Example 3

A VDF/HEA polymer was obtained in the same manner as in Comparative Example 1 except that 0.52 g of HEA in Comparative Example 1 was used. The obtained polymer was measured for the inherent viscosity and peel strength by 1H NMR measurement in the same manner as in Comparative Example 1. The results are shown in Table 1.

Comparative Example 4

A VDF/DMAEA polymer was obtained in the same manner as in Comparative Example 2 except that 2-(dimethylamino)ethyl acrylate (DMAEA) was used in place of HEA in Comparative Example 2. The obtained polymer was measured for the introduced amount of DMAEA by 1H NMR measurement. The results are shown in Table 1. The apparatus and measurement conditions in the 1H NMR measurement method are as described in Example 1. The amount of the structural unit derived from vinylidene fluoride and the amount of the structural unit derived from DMAEA in the polymer were calculated based on the integrated intensities of the signal observed by 1H NMR spectrum at 2.30 ppm originating mainly from DMAEA and the signals observed at 2.24 ppm and 2.87 ppm originating mainly from vinylidene fluoride.

The amount (mol %) of the structural unit derived from vinylidene fluoride (VDF amount) possessed by the obtained VDF/DMAEA polymer was 99.46 mol %, and the amount (mol %) of the structural unit derived from DMAEA (DMAEA amount) was 0.54 mol %.

The obtained VDF/DMAEA polymer was measured for the inherent viscosity in the same manner as in Example 1; the inherent viscosity was 1.5 dL/g.

An electrode was produced in the same manner as in Example 1 using the obtained VDF/DMAEA polymer, and the peel strength was measured. The results are shown in Table 1.

Comparative Example 5

An electrode was produced in the same manner as in Example 1 using the VDF/GMA polymer obtained in Example 1, and the peel strength was measured. The results are shown in Table 1.

Comparative Example 6

Vinylidene fluoride copolymer (2): VDF/CEA

An autoclave with an internal capacity of 2 liters was charged with 900 g of ion-exchanged water, 4 g of METOLOSE 90SH-1000, 2 g of butylperoxypivalate, 396 g of vinylidene fluoride, and 0.2 g of carboxyethyl acrylate (CEA), and the temperature was increased to 50° C. over 2 hours.

Then, the temperature was maintained at 50° C., and a 30 g/l CEA aqueous solution was gradually added at a rate at which the polymerization pressure became constant. CEA was added in a total amount of 5.92 g, including the amount initially added.

The polymerization was stopped at the same time as completion of the addition of the CEA aqueous solution, and was performed for a total of 13.1 hours from the start of the temperature increase.

After completion of the polymerization, the polymer slurry was heat-treated at 95° C. for 60 minutes, dehydrated, washed with water, and further dried at 80° C. for 20 hours to obtain a VDF/CEA copolymer.

The obtained polymer was measured for the introduced amount of CEA by 1H NMR measurement. The apparatus and measurement conditions in the 1H NMR measurement method are as described in Example 1. The amount of the structural unit derived from vinylidene fluoride and the amount of the structural unit derived from CEA in the VDF/CEA copolymer were calculated based on the integrated intensities of the signal observed by 1H NMR spectrum at 4.19 ppm originating mainly from CEA and the signals observed at 2.24 ppm and 2.87 ppm originating mainly from vinylidene fluoride.

The amount (mol %) of the structural unit derived from vinylidene fluoride (VDF amount) possessed by the obtained VDF/CEA copolymer was 97.28 mol %, and the amount (mol %) of the structural unit derived from CEA (CEA amount) was 2.72 mol %.

The obtained VDF/CEA copolymer was measured for the inherent viscosity in the same manner as in Example 1; the inherent viscosity was 2.65 dL/g.

Vinylidene fluoride copolymer (3) 10.1 g of VDF/CEA copolymer and 150 ml of NMP were placed and dissolved in a 500 ml three-necked flask equipped with a dimroth condenser, a dropping funnel, and a magnetic stirrer.

To the obtained solution, 5.30 g (0.0445 mol) of thionyl chloride was added dropwise at room temperature, and after completion of the addition, the mixture was heated with stirring at 80° C. for 1.5 hours.

After completion of stirring, the mixture was allowed to cool to room temperature, 4.34 g (0.0456 ml) of 3-hydroxypyridine (HP) was added, and the mixture was further heated with stirring at 90° C. for 1.5 hours.

After completion of stirring, the polymer was recovered by reprecipitation operation using a water/methanol mixed solvent as a poor solvent to obtain a vinylidene fluoride copolymer (3). The inherent viscosity of the obtained vinylidene fluoride copolymer (3) was measured in the same manner as in Example 1; the inherent viscosity was 2.07 dL/g.

The vinylidene fluoride copolymer (3) and PVDF having an inherent viscosity of 1.3 dL/g (KF #1700 available from Kureha Co., Ltd.) were mixed at a weight ratio of 10:90, thus obtaining a VDF/HP copolymer.

The inherent viscosity of the obtained VDF/HP copolymer was measured in the same manner as in Example 1; the inherent viscosity was 1.4 dL/g.

Further, using the obtained VDF/HP copolymer, an electrode was produced in the same manner as in Example 1, and the peel strength was measured. The results are shown in Table 1.

Comparative Example 7

A VDF/APS polymer was obtained in the same manner as in Comparative Example 2 except that acryloyloxypropyl succinic acid (APS) was used in place of HEA in Comparative Example 2. The obtained polymer was measured for the introduced amount of HEA by 1H NMR measurement. These results are shown in Table 1. The apparatus and measurement conditions in the 1H NMR measurement method are as described in Example 1. The amount of the structural unit derived from vinylidene fluoride and the amount of the structural unit derived from APS were calculated based on the integrated intensity of the signal observed by 1H NMR spectrum at 4.18 ppm mainly derived from APS and the signals mainly observed at 2.24 ppm and 2.87 ppm mainly derived from vinylidene fluoride.

The amount (mol %) of the structural unit derived from vinylidene fluoride (VDF amount) possessed by the obtained VDF/APS polymer was 99.67 mol %, and the amount (mol %) of the structural unit derived from APS (APS amount) was 0.33 mol %.

The inherent viscosity of the obtained VDF/APS polymer was measured in the same manner as in Example 1; the inherent viscosity was 1.5 dL/g.

An electrode was produced using the obtained VDF/APS polymer in the same manner as in Example 1, and the peel strength was measured. The results are shown in Table 1.

Comparative Example 8

An electrode was produced in the same manner as in Example 1 using the PVDF (2) obtained in Comparative Example 1, in which NMG was added to the electrode mixture so that the mixing ratio by weight was PVDF (2)/NMG=99.17:0.83. The obtained electrode was measured for the peel strength. The results are shown in Table 1.

Comparative Example 9

An electrode was produced in the same manner as in Example 1 except that PVDF (KF #7300 available from Kureha Corporation) was used as the polymer, and the peel strength was measured. The results are shown in Table 2.

Comparative Example 10

An electrode was produced in the same manner as in Example 1 using the VDF/GA copolymer obtained in Example 4, and the peel strength was measured. The results are shown in Table 2.

Comparative Example 11

An electrode was produced in the same manner as in Example 1 using the vinylidene fluoride copolymer (2) obtained in Example 8, and the peel strength was measured. The results are shown in Table 2.

Comparative Example 12

An electrode was produced in the same manner as in Example 1 using PVDF (KF #7300 available from Kureha Corporation) was used as the polymer, in which NMG was added to the electrode mixture so that the mixing ratio by weight was PVDF:NMG=99.17:0.83. The obtained electrode was measured for the peel strength. The results are shown in Table 2.

TABLE 1

| Polymer | | Introduced amount mol % | Inherent viscosity dL/g | Peel strength gf/mm |
|---|---|---|---|---|
| Example 1 | VDF/NMG | 0.27 | 1.5 | 7.9 |
| Example 2 | VDF/ADG | 0.27 | 1.5 | 10.5 |
| Example 3 | VDF/HGABA | 0.27 | 1.5 | 6.2 |
| Example 6 | VDF/NMG | 0.16 | 1.5 | 7.9 |
| Example 7 | VDF/GMA + NMG | 0.27 | 1.5 | 5.7 |
| Comparative Example 1 | PVDF | — | 1.7 | 3.4 |
| Comparative Example 2 | VDF/HEA | 1.20 | 1.5 | 6.0 |
| Comparative Example 3 | | 0.47 | 1.5 | 5.0 |
| Comparative Example 4 | VDF/DMAEA | 0.54 | 1.5 | 3.1 |
| Comparative Example 5 | VDF/GMA | 0.27 | 1.5 | 4.3 |
| Comparative Example 6 | VDF/HP | 0.27 | 1.4 | 3.1 |
| Comparative Example 7 | VDF/APS | 0.33 | 1.5 | 4.3 |
| Comparative Example 8 | PVDF + NMG | 0.27 | 1.7 | 5.1 |

TABLE 2

| Polymer | | Introduced amount mol % | Inherent viscosity dL/g | Peel strength gf/mm |
|---|---|---|---|---|
| Example 4 | VDF/NMG | 0.40 | 2.8 | 6.8 |
| Example 5 | VDF/ADG | 0.40 | 2.8 | 6.8 |
| Example 8 | VDF/APS + NMG | 0.63 | 2.5 | 7.0 |
| Comparative Example 9 | PVDF | — | 3.1 | 3.5 |
| Comparative Example 10 | VDF/GA | 0.40 | 2.8 | 4.0 |
| Comparative Example 11 | VDF/APS | 0.36 | 2.5 | 5.9 |
| Comparative Example 12 | PVDF + NMG | 0.27 | 3.1 | 5.3 |

INDUSTRIAL APPLICABILITY

The vinylidene fluoride polymer of the present invention can be used for a binder composition used for binding an electrode active material to a current collector in a non-aqueous electrolyte secondary battery.

The invention claimed is:

1. A vinylidene fluoride polymer comprising a first structural unit derived from vinylidene fluoride and a second structural unit derived from a monomer other than vinylidene fluoride,
   the monomer to be the second structural unit being a compound represented by Formula (1),
   and the content of the second structural unit being from 0.05 to 20 mol % when the total of structural units derived from all the monomers constituting the vinylidene fluoride polymer is 100 mol %,

[Chemical Formula 1]

(1)

where $R_1$ is a hydrogen atom or has a (meth)acrylate group, $R_2$ has a (meth)acrylate group, and $R_{OH, COOH}$ is a carbon skeleton of a hydrocarbon having from 1 to 7 carbon atoms, wherein one or more hydrogen atoms bonded to the carbon atoms are substituted with at least one of a hydroxyl group and a carboxyl group.

2. The vinylidene fluoride polymer according to claim 1, wherein an inherent viscosity is from 0.5 to 5.0 dL/g.

3. A binder composition used for binding an electrode active material to a current collector, the binder composition comprising the vinylidene fluoride polymer described in claim 1.

4. An electrode mixture comprising the binder composition described in claim 3 and an electrode active material.

5. An electrode comprising a mixture layer formed of the electrode mixture described in claim 4 on a current collector.

6. A non-aqueous electrolyte secondary battery comprising the electrode described in claim 5.

7. A method for producing an electrode mixture comprising the vinylidene fluoride polymer described in claim 1, comprising:
   preparing a raw material electrode mixture containing a polar group-containing vinylidene fluoride polymer or a reactive group-containing vinylidene fluoride polymer, an electrode active material, and a non-aqueous solvent; and
   adding a compound represented by Formula (7) to the raw material electrode mixture and reacting the polar group-containing vinylidene fluoride polymer or the reactive group-containing vinylidene fluoride polymer with the compound to produce the vinylidene fluoride polymer:

[Chemical Formula 2]

(7)

where $R_6$ and $R_7$ each independently represent a hydrogen atom or have a carbon skeleton having from 1 to 7 carbon atoms, $R_{OH, COOH}$ is a carbon skeleton of a hydrocarbon having from 1 to 7 carbon atoms, wherein one or more of the hydrogen atoms bonded to the carbon atoms are substituted with at least one of a hydroxyl group and a carboxyl group.

\* \* \* \* \*